United States Patent [19]

Gasbarro et al.

[11] Patent Number: 5,432,823
[45] Date of Patent: Jul. 11, 1995

[54] METHOD AND CIRCUITRY FOR MINIMIZING CLOCK-DATA SKEW IN A BUS SYSTEM

[75] Inventors: James A. Gasbarro, Mountain View; Mark A. Horowitz; Richard M. Barth, both of Palo Alto; Winston K. M. Lee, South San Francisco; Wingyu Leung, Cupertino; Paul M. Farmwald, Portola Valley, all of Calif.

[73] Assignee: Rambus, Inc., Mountain View, Calif.

[21] Appl. No.: 178,601

[22] Filed: Jan. 7, 1994

Related U.S. Application Data

[63] Continuation of Ser. No. 848,417, Mar. 6, 1992, abandoned.

[51] Int. Cl.$^6$ ............................................. H04L 7/00
[52] U.S. Cl. .................................... 375/356; 375/371; 370/103; 370/108
[58] Field of Search ............... 375/118, 119, 107, 106; 370/108, 103; 371/1; 328/55, 63

[56] References Cited

U.S. PATENT DOCUMENTS

| | | |
|---|---|---|
| 4,247,817 | 1/1981 | Heller . |
| 4,481,625 | 11/1984 | Roberts et al. . |
| 4,519,034 | 5/1985 | Smith et al. . |
| 4,785,394 | 11/1988 | Fischer . |
| 4,811,202 | 3/1989 | Schabowski . |
| 4,860,198 | 8/1989 | Takenaka . |
| 4,949,361 | 8/1990 | Jackson ................ 375/118 |
| 4,998,262 | 3/1991 | Wiggers ................ 370/108 |

FOREIGN PATENT DOCUMENTS

| | | |
|---|---|---|
| WO8400219 | 6/1983 | European Pat. Off. . |
| 0175564 | 9/1985 | European Pat. Off. . |
| 0347557 | 4/1989 | European Pat. Off. . |
| 9102590 | 4/1991 | WIPO . |

Primary Examiner—Stephen Chin
Assistant Examiner—Hai H. Phan
Attorney, Agent, or Firm—Blakely, Sokoloff, Taylor & Zafman

[57] ABSTRACT

A bus system is described that minimizes clock-data skew. The bus system includes a data bus, a clockline and synchronization circuitry. The clockline has two clockline segments. Each clockline segment extends the entire length of the data bus and is joined to the other clockline segment by a turnaround at one end of the data bus. The clockline ensures that clock and data signals travel in the same direction. Synchronization circuitry within transmitting devices synchronizes data signals to be coupled onto the data bus with the clock signal used by other devices to receive the data.

22 Claims, 8 Drawing Sheets

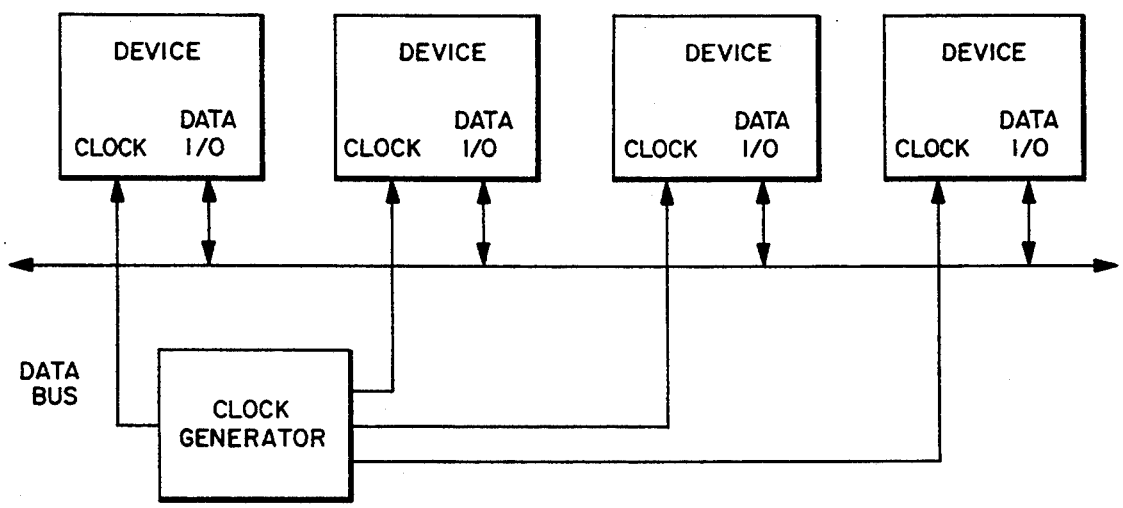
FIG _ 1 (PRIOR ART)

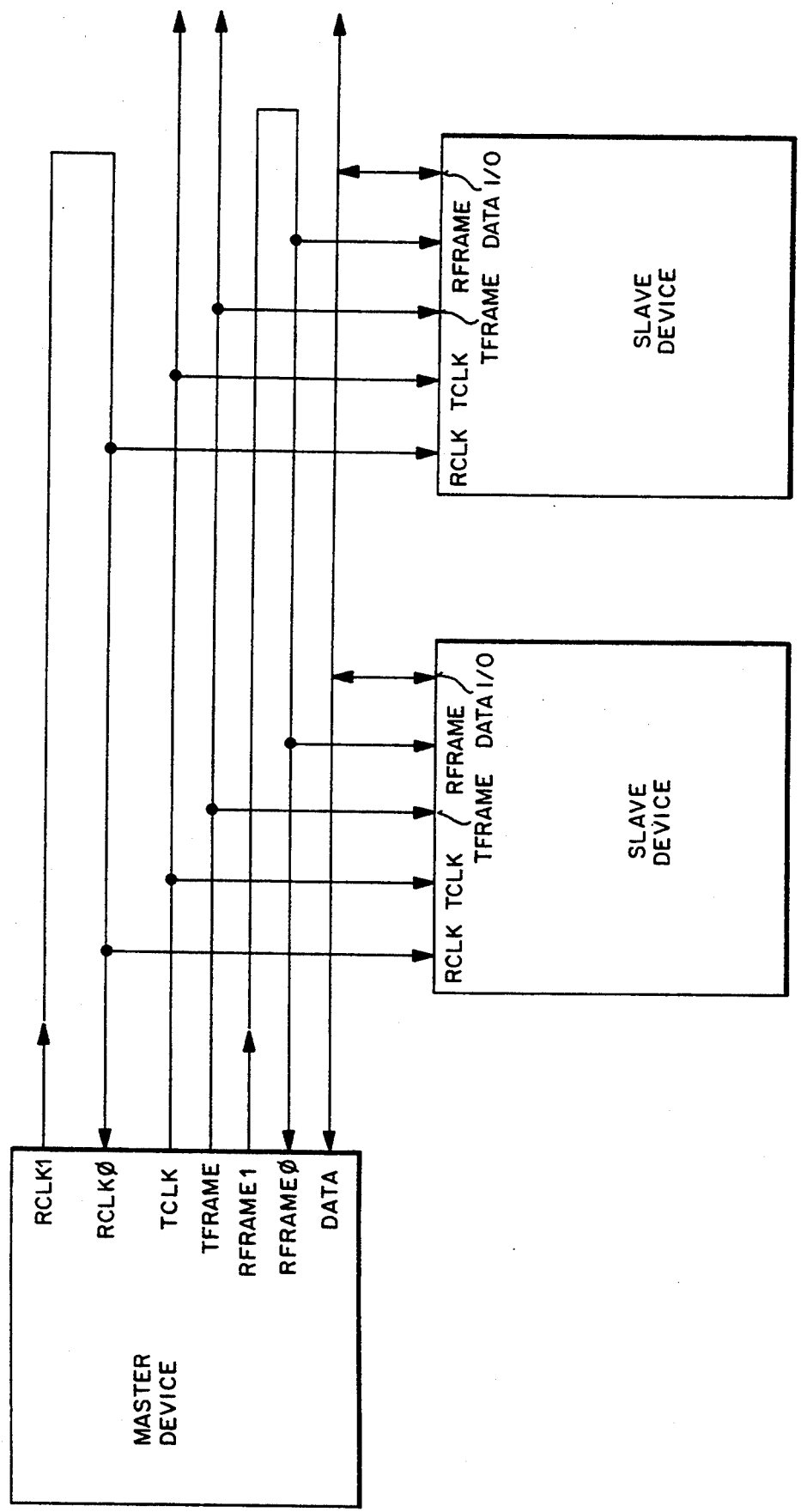
FIG__2 (PRIOR ART)

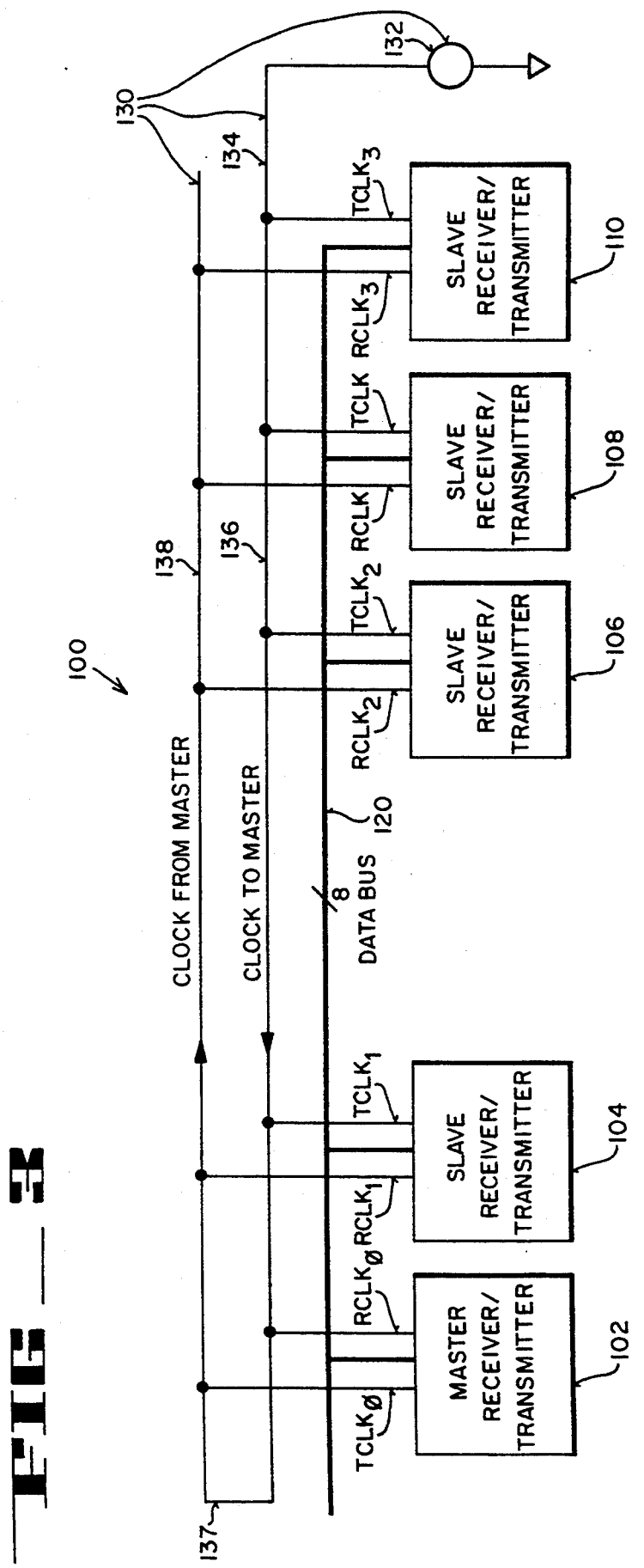

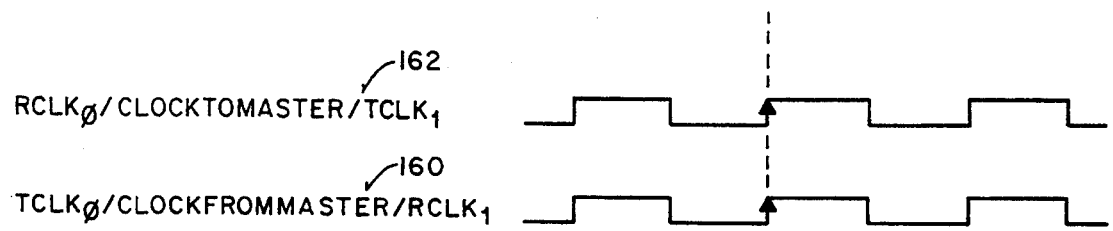
FIG_4A
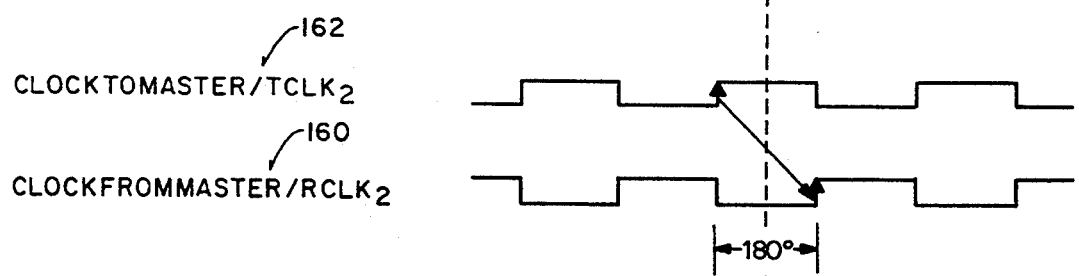
FIG_4B
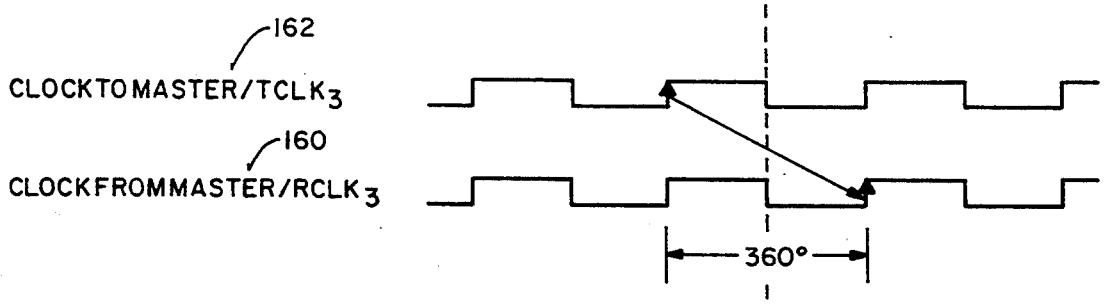
FIG_4C

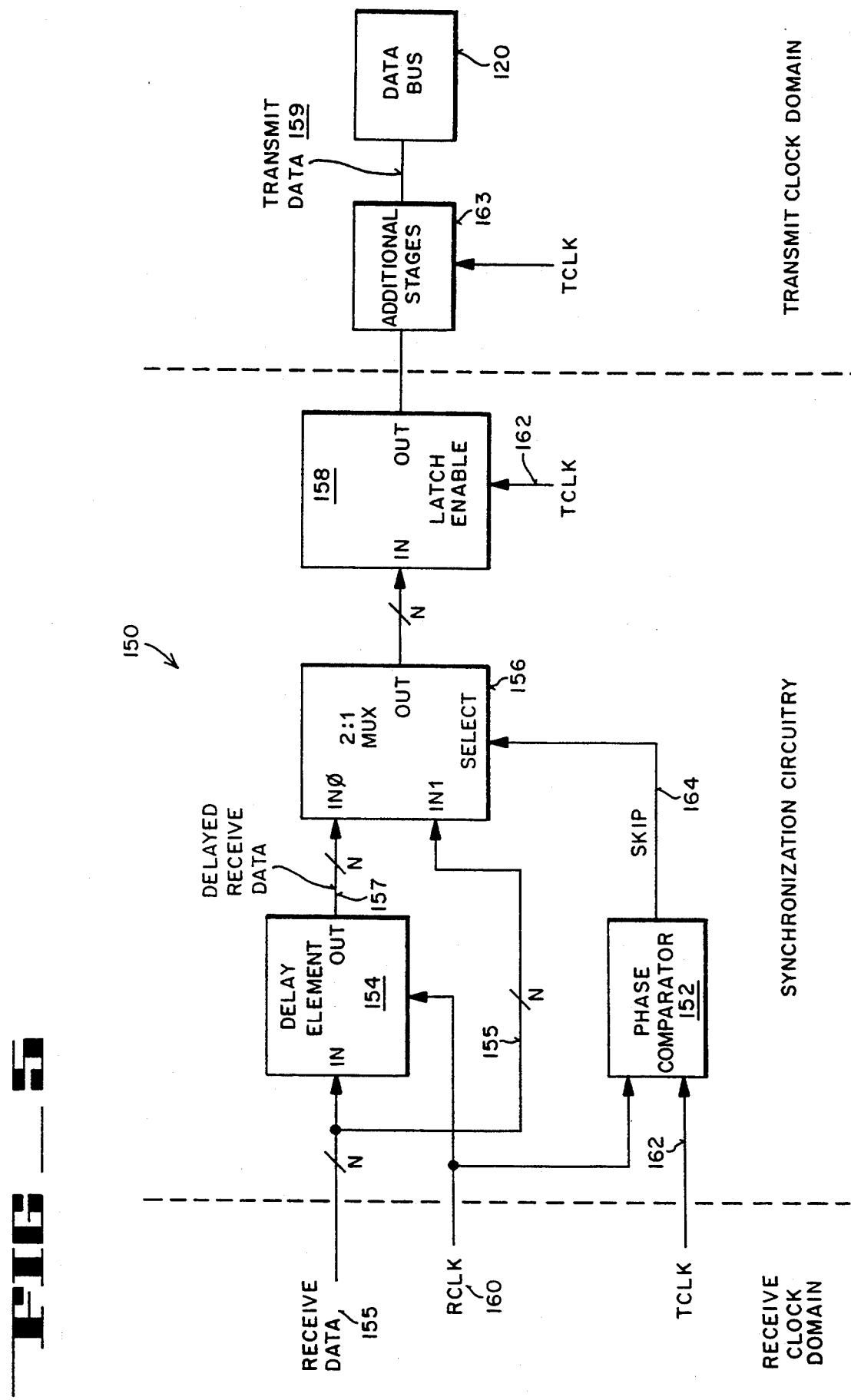

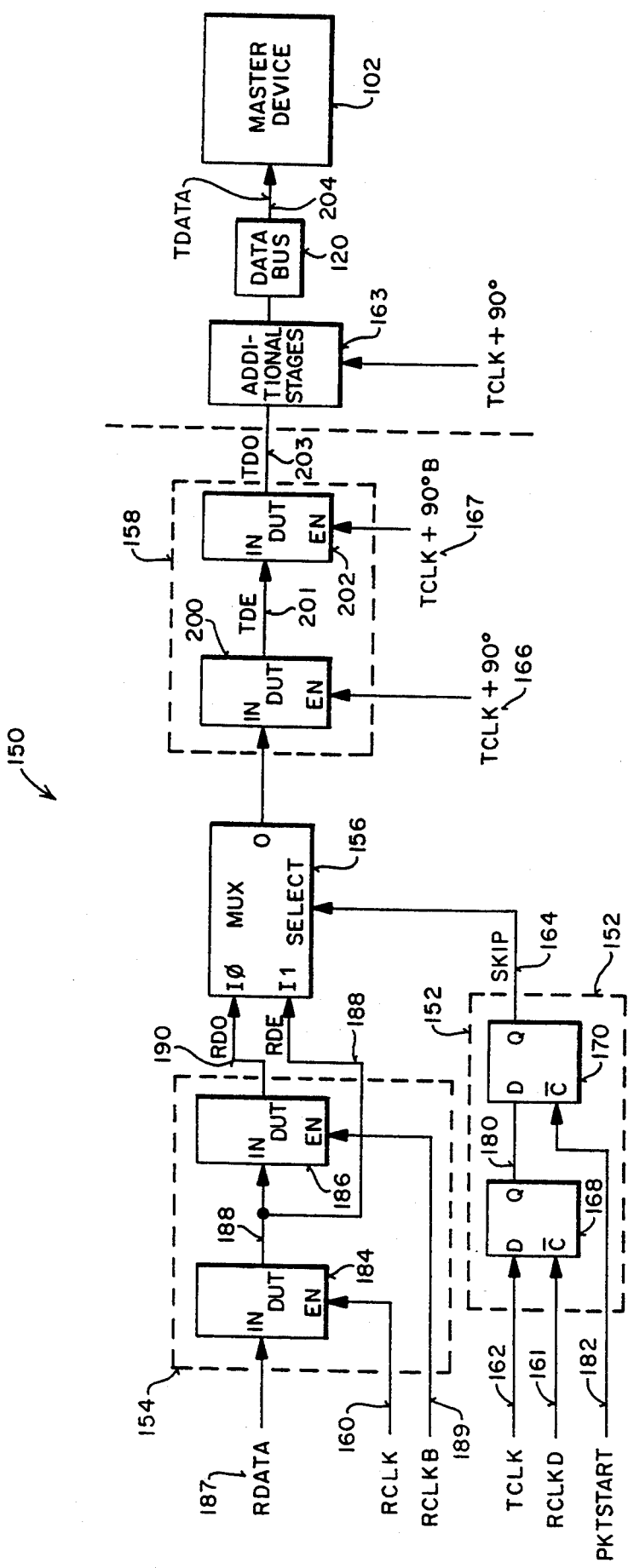

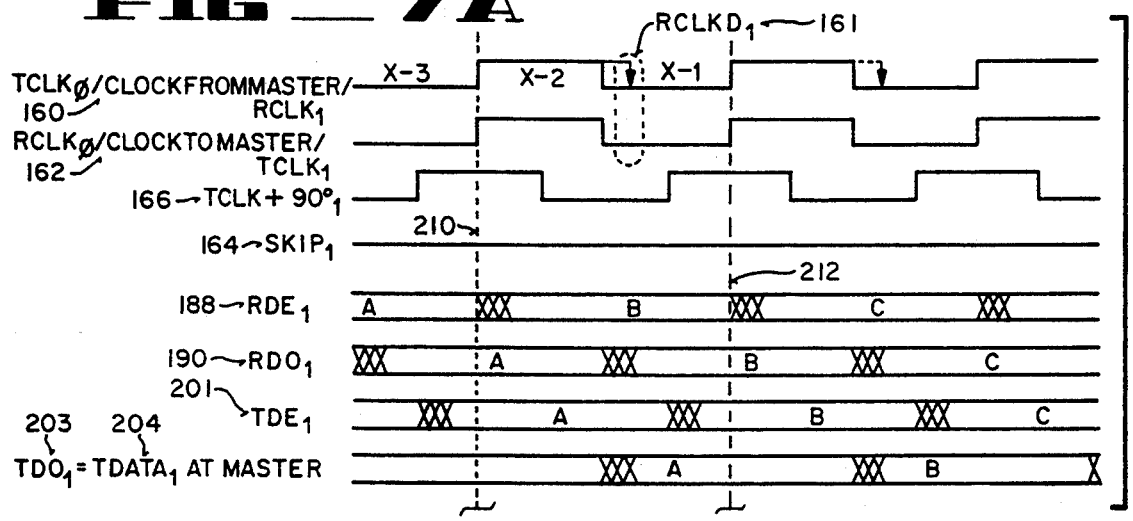
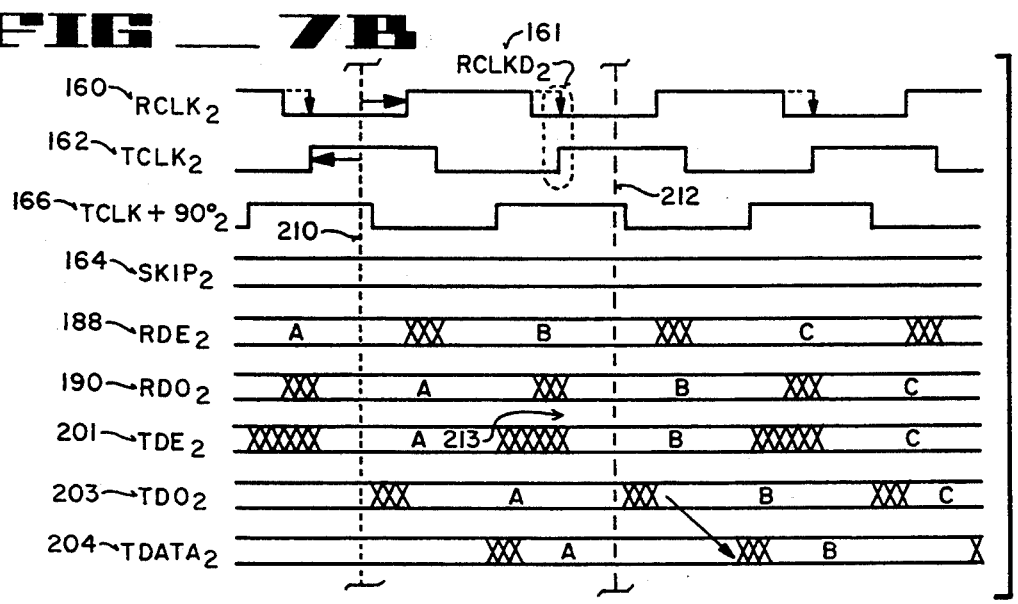
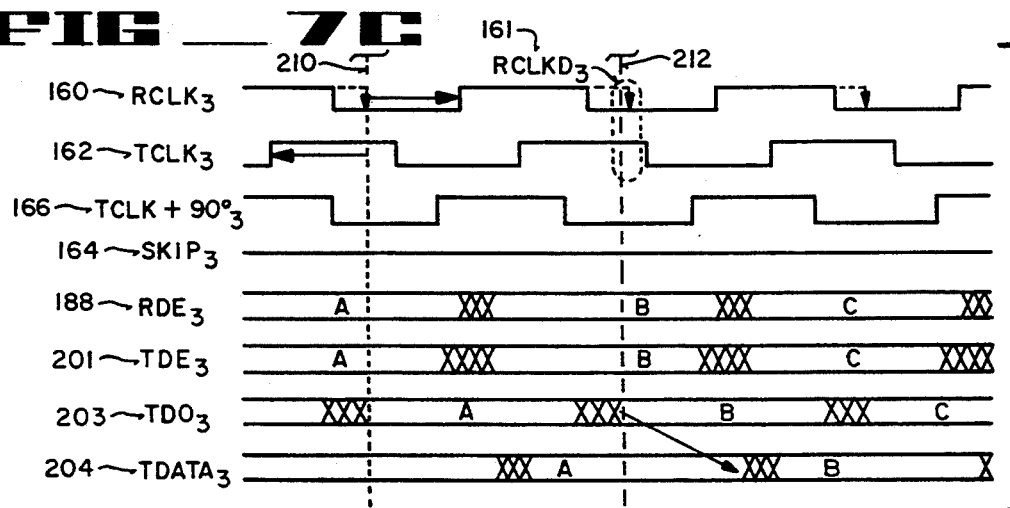

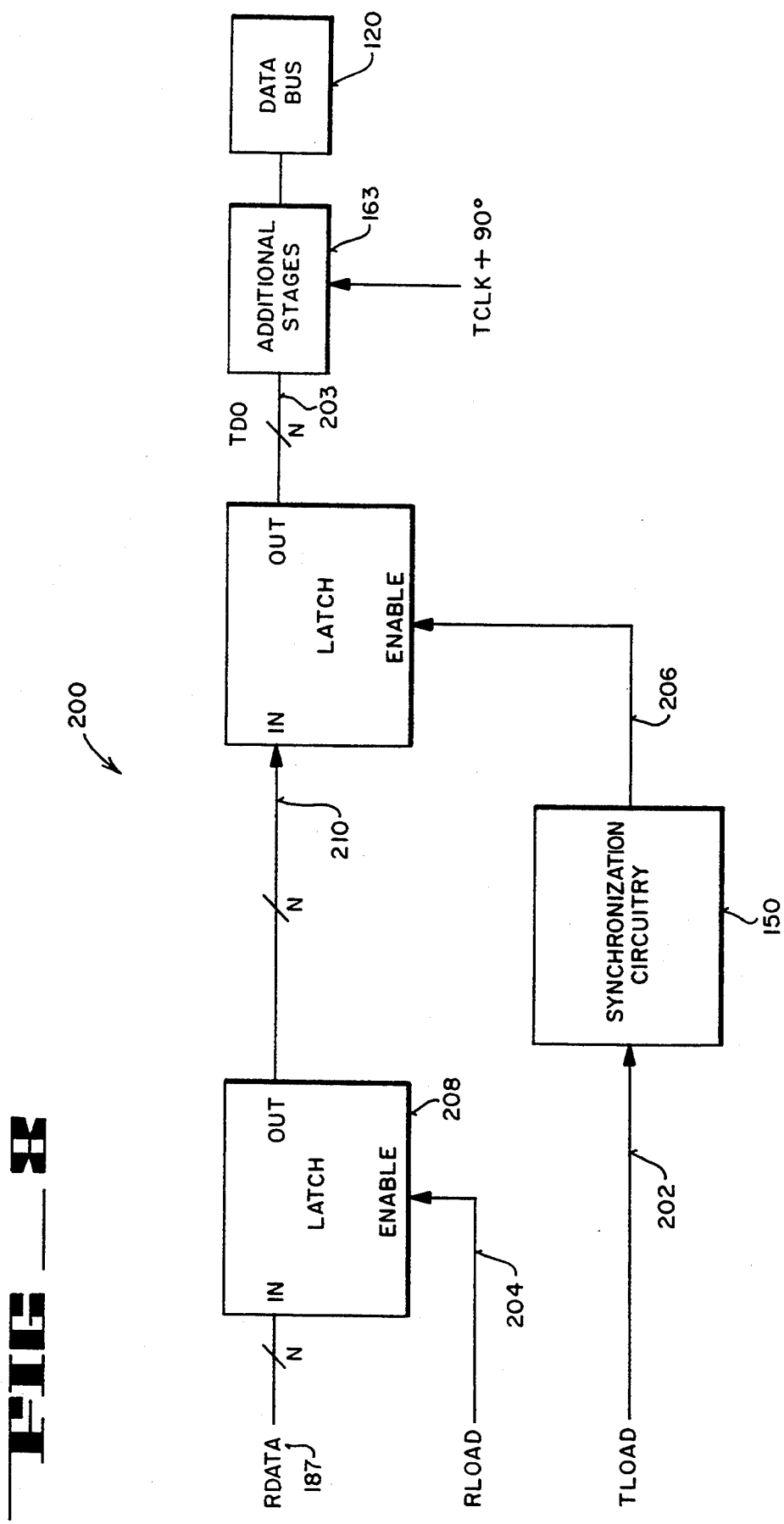

METHOD AND CIRCUITRY FOR MINIMIZING CLOCK-DATA SKEW IN A BUS SYSTEM

This is a continuation of application Ser. No. 07/848,417, filed Mar. 6, 1992 abandoned.

FIELD OF THE INVENTION

The present invention relates to synchronous bus systems. More particularly, the present invention relates to a bus system for minimizing clock-data skew in order to avoid errors, wherein data transmission is synchronized with respect to a passing clock signal.

BACKGROUND OF THE INVENTION

Computer systems typically utilize a bus system. Several devices are typically coupled to a data bus. Some prior bus systems operate synchronously, i.e., using a clock signal to validate data signals. Within synchronous bus systems, clock-data skew can be a concern because such skew can prevent the clocking of valid data. Thus, data errors can result from clock-data skew. Clock-data skew results from the difference between data signal propagation delay and clock signal propagation delay.

For certain prior art synchronous bus systems with sufficiently short bus and clockline lengths, clock-data skew might not be a concern because clock and data signals have only a short distance to travel and arrive nearly instantaneously. Within a synchronous bus system with a long data bus and a long clockline, clock-data skew is often a concern, however, especially if high clock speeds are desired. Within many prior art synchronous bus systems, a clock period must exceed clock signal propagation delay. Put another way, clock speed must generally slow as clockline length increases. This prior art relationship is expressed by Expression 1:

(1) Clock Period > set-up time of data to clock signal + hold time of data to clock signal + clock-data skew One prior art scheme for reducing clock-data skew error is illustrated in FIG. 1. Rather than using a single clock source, multiple clock sources are used. That is, many matched clock lines are coupled to a single clock generator. The clock lines are matched so that a clock signal arrives at each device at substantially the same point in time, despite long clockline lengths. Thus, the bus system shown must operate with a clock period that is greater than or equal to the data propagation delay of the bus plus clock data skew plus clock to data hold time plus clock to data set-up time.

One disadvantage of the bus system of FIG. 1, however, is the relative complexity of that bus system. A clockline is required for each device that is clocked and each clockline typically must be carefully tuned to ensure simultaneous clocking of all devices. Another disadvantage of the bus system of FIG. 1 is that its clock period is limited by the propagation delay of the data bus.

FIG. 2 illustrates a different prior art synchronous bus system scheme utilizing a long data bus. The master device generates two clock signals—namely, a receive clock, RCLK, and a transmit clock, TCLK. In conjunction with appropriate frame control signals, the receive clock is used to clock both the transmission of data by slave devices and the reception of data by the master device. The bus system of FIG. 2 thus decouples clock period from the propagation delay of the data bus.

A disadvantage of the bus system scheme of FIG. 2 is that two clock sources are required (rather than a single clock source) in addition to control signals. A further disadvantage is that the bus system of FIG. 2 permits only one master device.

SUMMARY AND OBJECTS OF THE INVENTION

One object of the present invention is to reduce or eliminate clock and data timing errors.

Another object of the present invention is to provide a data bus that allows high speed clocking of data while reducing clock and data timing errors.

Another object of the present invention is to minimize clock-data skew to avoid errors in a bus system with a relatively long bidirectional data bus.

Another object of the present invention is to minimize clock-data skew to avoid errors in a bus system with a relatively long clockline.

Another object of the present invention is to minimize clock-data skew to avoid errors in a computer system having a relatively high speed bus.

Another object of the present invention is to avoid having a speed of a bus be limited by clockline length or bus length.

Another object of the present invention is to provide a synchronous bus system in which clock;data skew is reduced or eliminated.

Another object of the present invention is to avoid the necessity of multiple clocks for a high speed bus system with a relatively long bus.

A further object of the present invention is to provide a high speed synchronous data bus.

Another object of the present invention is to provide a synchronous data bus that accommodates a fixed latency protocol between devices on the bus.

Another object of the present invention is to provide a data bus that accommodates a multiplicity of master devices.

A further object of the present invention is to provide a data bus in which a clock period is independent of bus length.

A bus system is described that has a topology that minimizes clock-data skew. The bus system includes a data bus, a clockline, and means for sending a data signal to the data bus. The clockline has two segments, each segment extending the entire length of the data bus. The segments are joined by a turnaround at one end of the data bus. Devices in the bus system use one clockline segment as a receive clock and the other clockline segment as a transmit clock. Means are provided for sending a data signal onto the data bus such that the data signal will travel on the data bus in a constant phase relationship with respect to the clock signal. The result of the bus topology is that a data signal sent onto the data bus travels contemporaneously with and in the same direction as the clock signal used to receive the data.

The bus system uses synchronization circuitry to send a data signal to the data bus such that the data signal will travel on the data bus in a constant phase relationship with respect to the clock signal. The synchronization circuitry synchronizes data with the transmit clock of the particular device. The synchronization circuitry includes a phase comparator, which generates a select signal by comparing the receive clock to the transmit clock. A multiplexer uses the select signal to select between delayed and undelayed versions of data, data which is aligned with the receive clock. The multiplexer output is coupled the input of a latch, the enable input of which is coupled to the transmit clock. The latch thus outputs data synchronized with the transmit clock of the particular device.

Other objects, features, and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which:

FIG. 1 is a block diagram of one prior art bus system.

FIG. 2 is a block diagram of another prior art bus system.

FIG. 3 is a block diagram of a clock distribution system.

FIG. 4A shows examples of clock signal waveforms for a device located near the turnaround of the clockline.

FIG. 4B shows examples of clock signal waveforms for a device located in the middle of the clockline.

FIG. 4C shows examples of clock signal waveforms for a device located relatively far from the turnaround.

FIG. 5 is a block diagram of synchronization circuitry.

FIG. 6 is a schematic diagram of the synchronization circuitry.

FIG. 7A is a timing diagram for synchronization circuitry located near the turnaround.

FIG. 7B is a timing diagram for synchronization circuitry located near the middle of the clockline.

FIG. 7C is a timing diagram for synchronization circuitry located relatively far from the turnaround.

FIG. 8 is a block diagram of an alternative synchronization scheme.

DETAILED DESCRIPTION

FIG. 3 illustrates in block diagram form one preferred synchronous bus system 100. As will be described in more detail below, bus system 100 reduces or eliminates clock-data skew. To do so, bus system 100 uses a clock distribution system together with synchronization circuitry within each device.

The clock distribution system includes a clockline having two segments. One segment extends from one end of the data bus to a turnaround point near the second end of the data bus. The other clock segment extends from the turnaround back to the second end of the data bus. This topology ensures that a data signal sent by a device onto the data bus travels contemporaneously with and in the same direction as the clock signal used by a second device to receive the data.

Synchronization circuitry of bus system 100 thus allows data to be transmitted substantially at the time the transmit clock arrives so that clock and data signals travel together. In other words, the synchronization circuitry sends a particular data signal to the data bus such that the data signal will travel on the data bus in a constant phase relationship with respect to the clock signal. This serves to minimize clock-data skew, which in turn helps to reduce or eliminate errors caused by clock-data skew.

High-speed synchronous bus system 100 includes a master device 102 and slave devices 104, 106, 108 and 110. Master device 102 is coupled to slave devices 104, 106, 108 and 110 via data bus 120. Master device 102 is preferably located near the turnaround in the clockline.

As used herein, the terms "master" and "slave" differ somewhat from their conventional meanings. Within bus system 100, a master is a device that can communicate both with other masters and with slaves, and is located near the turnaround in the clockline. In contrast, slaves can only communicate with masters and may be located anywhere along data bus 120.

For one embodiment, master 102 is a microprocessor. For another embodiment, master device 102 is a peripheral controller.

For one embodiment, slave devices 104, 106, 108, and 110 are high speed memories. For example, slave devices 104, 106, 108, and 110 can be dynamic random access memories (DRAMs). For another embodiment, slave devices 104, 106, 108, and 110 are bus transceivers. For another embodiment, slave devices 104, 106, 108, and 110 are peripheral devices. For another embodiment, slave devices 104, 106, 108, and 110 function as input/output ("I/O") ports.

Synchronous bus system 100 may include many slave devices, even though only four are illustrated in FIG. 3. Alternatively, synchronous communications system 100 may include multiple masters. In those embodiments including multiple masters, master devices should be located close together near the turnaround in the clock line to facilitate rapid communication.

Master device 102 initiates an exchange of data by broadcasting an access request packet. Each slave device of devices 104, 106, 108, and 110 decodes the access request packet and determines whether it is the selected slave device and the type of access requested. The selected slave device then responds appropriately, either reading or writing a packet of data in pipelined fashion.

Synchronous bus system 100 preferably utilizes a fixed latency protocol to exchange data over data bus 120. A fixed latency protocol requires that a fixed number of clock cycles occur between a request for data by master device 102 and the clocking in of the first byte of that data by master device 102, irrespective of which slave device transmits the data. A fixed latency protocol also requires control information transmitted use fixed latency.

Data bus 120 provides a high-speed bidirectional direct interconnection between master device 102 and slave devices 104, 106, 108, and 110. Data bus 120 preferably operates at approximately 250 megahertz ("MHZ") with dual-edge transfer. In other words, transfers may occur approximately every 2 nanoseconds. The end-to-end signal propagation delay of data bus 120 is significant as compared to the clock period. In fact, for one embodiment of synchronous communications system 100, the end-to-end propagation delay of data bus 120 is approximately half that of the clock period, which is approximately 4 nanoseconds. This data signal propagation delay might introduce unacceptable clock-data skew in some prior synchronous systems.

Devices coupled to data bus 120 must include input circuitry having very low latency to receive data and receive clock signals. For example, a phase locked loop, a delay locked loop, or clock compensation circuitry would provide acceptably low latency.

Clock distribution system 130 aids in eliminating clock-data skew by causing clock and data signals to travel in the same direction. Clock distribution system 130 includes clock 132 and clockline 134. Clock 132 is external to and independent of devices 102, 104, 106, 108, and 110. Because clock generation is independent, bus system 100 accommodates multiple masters. Clock 132 is coupled to an end of clockline 134 so that the clock signal travels in only one direction, from clock 132 toward the opposite end of clockline 134. Clockline 134 carries the clock signal to all devices within bus system 100. Clockline 134 is long, nearly twice the length of data bus 120, and doubles back, or turns around, near one end of data bus 120. Thus, clockline 134 may be thought of as two clockline segments. Segment 136 extends from one end of data bus 120 to turnaround point 137, which is located at the other end of data bus 120. The other segment, segment 138, extends from turnaround point 137 back to the opposite end of data bus 120.

The propagation delay of each clockline segment 136 and 138 is substantially equal to the propagation delay of data bus 120, in the preferred embodiment.

The clock signal on segment 136 travels from clock 132 toward master device 102. For this reason, the clock signal on segment 136 is named CLOCKTOMASTER. CLOCKTOMASTER travels in the same direction as data signals sent by slave devices 104, 106, 108, and 110 to master device 102 via data bus 120. Transmit clock inputs of slave devices 104, 106, 108 and 110 are coupled to CLOCKTOMASTER. In FIG. 3 this is shown by connection of slave device transmit clock inputs $TCLK_1$, $TCLK_2$, $TCLK_3$ to segment 136. Master device 102 uses the clock signal on segment 136 to receive data signals on data bus 120. Thus, the receive clock input, $RCLK_0$, of master device 102 is coupled to segment 136.

Turnaround 137 causes the clock signal on segment 138 to change direction and travel toward the opposite end of the data bus. This is the same direction that data signals travel from master device 102 to slave devices 104, 106, 108, and 110 travel. For this reason master device 102 uses this signal, called CLOCKFROMMASTER, as its transmit clock, $TCLK_0$. In a symmetrical fashion, slave devices 104, 106, 108, and 110 use CLOCKFROMMASTER as receive clock inputs. Data signals from master device travel to the slave devices in the same direction as the active CLOCKFROMMASTER signal on segment 138.

Having clock and data signals travel in the same direction is not sufficient to eliminate clock-data skew. The length of clockline 134 is such that active clock pulses do not reach each device 102, 104, 106, 108, and 110 simultaneously. Therefore, each device 102, 104, 106, 108 and 110 must couple data signals onto data bus 120 just at the moment its active transmit clock travels past. This is analogous to surfing, in which the surfer watches and anticipates the crest of the wave to catch it and travel with it. The synchronization dilemma faced by devices 102, 104, 106, 108, and 110 is, however, more complicated than surfing because each device receives data with a receive clock and transmits data with a separate transmit clock.

Within clock distribution system 130 the transmit clock and receive clock always have the same frequency because only one clock source is used. Given the position of a device relative to turnaround 137, however, the phase between CLOCKFROMMASTER and CLOCKTOMASTER varies. FIGS. 4A, 4B, and 4C illustrate this difference in phase between CLOCKFROMMASTER and CLOCKTOMASTER for an embodiment of bus system 100 in which the propagation delay of data bus 120 is approximately equal to one clock period. The exact amount of phase shift, of course, varies as clock period and the data bus length vary.

FIG. 4A illustrates the timing of clock signals for slave device 104, which is located very near turnaround 137. At this location, the phase difference between CLOCKFROMMASTER/$RCLK_1$ 160 and CLOCKTOMASTER/$TCLK_1$ 16 is nearly 0°.

FIG. 4B illustrates the timing of receive clock $RCLK_2$ 160 and $TCLK_2$ 162 for slave device 106, which is located approximately half the length of data bus 120 away from turnaround 137. At this location, the phase difference between CLOCKFROMMASTER/$RCLK_2$ 160 and CLOCKTOMASTER/$TCLK_2$ 162 is approximately 180°.

FIG. 4C illustrates the timing of signals for slave device 110. Far from turnaround 137 the phase difference between CLOCKFROMMASTER/$RCLK_3$ 160 and CLOCKTOMASTER/$TCLK_3$ is approximately 360°.

The phase difference experienced by each device within bus system 100 presents a challenge to utilization of identical devices within bus system 100. Satisfying this desire requires identical circuitry that accounts for variable phase difference between device receive and transmit clocks.

FIG. 5 illustrates in block diagram form synchronization circuitry 150, which compensates for variable phase difference experienced at different locations. The phase difference is constant within each device on data bus 120, however. Synchronization circuitry 150 is included in each device 102, 104, 106, 108, and 110. Briefly described, synchronization circuitry 150 synchronizes with the transmit clock data signals aligned with a receive clock. Synchronization circuitry 150 thus ensures that data signals coupled by one device onto the data bus contemporaneously travel together with the clock signal used by another device to receive the data.

Synchronization circuitry 150 includes phase comparator 152, delay element 154, two to one (2:1) multiplexer 156, and latch 158.

Phase comparator 152 compares a receive clock input RCLK 160 to a transmit clock input TCLK 162 to determine the relative phase between the two signals. In slave devices 104, 106, 108, and 110, CLOCKFROMMASTER is coupled to input RCLK 160 and CLOCKTOMASTER is coupled to input TCLK 162.

The signal output from phase comparator 152, SKIP 164, represents the relative phase difference between the two inputs 160 and 162. SKIP 164 is low for slave devices near turnaround 137 and high for slave devices far from turnaround 137. At the center of data bus 120 the level of SKIP 164 is uncertain, but this does not matter, as will be explained later.

SKIP 164 selects which of the two inputs to multiplexer 156 will be output to latch 158. One input to multiplexer 156 is undelayed receive data 155. The second input to multiplexer 156 is a delayed version of receive data 155, DELAYED RECEIVED DATA 157. DELAYED RECEIVED DATA 157 is generated by delay element 154. For slave devices far from turnaround 137, no delay is needed and SKIP 164 selects UNDELAYED RECEIVED DATA 155. At the opposite end of system 100, near turnaround 137, SKIP 164 selects DELAYED RECEIVED DATA 157 to compensate for the short propagation delay for those devices.

Latch 158 captures the output of multiplexer 156 and synchronizes the data to TCLK 162.

Additional stages 163, which are synchronized to the device's transmit clock, may be inserted after latch 158 prior to coupling data onto the data bus 120.

FIG. 6 is a schematic diagram of synchronization circuitry 150. For the sake of simplicity, synchronization circuitry for a single data bit is illustrated. Synchronization for an entire data word is achieved simply by using a number of delay elements 154, 2:1 multiplexers 156 and latches 158 in parallel. Only one phase comparator 152 is necessary per slave device.

Synchronization circuitry 150 differs slightly from that described with respect to FIG. 5. This difference ensures that transmit data is centered on the transition of the device's transmit clock. Put another way, synchronization circuitry 150 ensures that data coupled onto the bus by a first device when received by a second device will be centered around the transition of a second device's receive clock. This is done by synchronizing data to an advanced version of TCLK 162, TCLK+90° 166. TCLK+90° 166 is generated from TCLK 162 using a phase locked loop, which is also included in each device 102, 104, 106, 108, and 110. The phase locked loop also generates a complement to TCLK+90° 166, TCLK+90° B 167, where "B" stands for bar, or complement.

Within synchronization circuitry 150, phase comparator 152 is comprised of two edge-triggered D flip-flops, 168 and 170. D flip-flop 168 samples TCLK 162 on the falling edge of RCLKD 161. RCLKD 161 is a slightly delayed version of RCLK 160. This slight delay biases the timing of D flip-flop 168 to ensure that the its output is low for devices near turnaround 137, i.e., when CLOCKTOMASTER and CLOCKFROMMASTER are in phase.

The output 180 of D flip-flop 168 is high for devices far from turnaround 137 and low for devices near turnaround 137. Output 180 is uncertain, and may even be meta-stable, for devices near the middle of data bus 120. D flip-flop 170 samples output 180, guaranteeing that SKIP 164 settles properly. D flip-flop 170 samples output 180 using a signal that indicates the start of a packet, PKTSTART 182. Each slave device generates its own PKTSTART 182 when the slave determines that master device 102 has requested access to that slave. There is sufficient time between the falling edge of PKTSTART 182 and when SKIP 164 is used to allow SKIP 164 to settle properly. As will be discussed later, at the center of data bus 120 it does not matter whether SKIP 164 settles high or low because the timing at master device 102 will be acceptable in either case.

Within synchronization circuitry 150, latch 186 corresponds to delay element 154. Latch 184 captures data to be transmitted, RDATA 187, using RCLK 160 as an enable input. Latch 186 captures the output of latch 184, RDE 188, and delays it by half a clock cycle by using RCLKB 189. RCLKB 189 is the complement of RCLK 160.

As the phase difference between RCLK 160 and TCLK 162 approaches zero, synchronizing data clocked with RCLK 160 to TCLK 162 is difficult because both clock signals change state simultaneously. Latch 186 helps alleviate this problem by changing the clocking of data to RCLKB 189 from RCLK 160.

Inputs of multiplexer 156 are coupled to RDO 190 and RDE 188. SKIP 164 selects between the two multiplexer inputs.

Latches 200 and 202 correspond generally to latch 158. Two latches are used to transfer data between RCLK and TCLK domains while avoiding possible timing hazards.

The data signal received by master device 102 after propagation down bus 120 is denominated TDATA 204. TDATA 204 is a time delayed version of TDO 203. The amount of delay depends on delay caused by additional stages 163 and the signal propagation delay between master device 102 and each slave device.

FIGS. 7A, 7B, and 7B illustrate the operation of synchronization circuitry 150 at three different locations relative to turnaround 137. Regardless of the device transmitting data, data is centered on the transitions of the transmitting devices's transmit clock, e.g., CLOCKTOMASTER for slave devices 104, 106, 108 and 110. In other words, each slave 104, 106, 108, and 110 transmits data so that receive data at master 102 is centered around transitions in the master's receive clock. Thus, master 102 always clocks in valid data.

Certain notations and conventions are used in FIGS. 7A, 7B, and 7C. The synchronization circuitry signals in these three devices are differentiated from one other by numeric subscripts. For example, SKIP 164 in slave device 104 is referred to as SKIP1 and in slave device 108 as SKIP3. The signals $RCLKD_1$, $RCLKD_2$, and $RCLKD_3$ are not represented by separate waveforms. The falling edges of these signals signals are represented by dashed lines on the waveforms of $RCLK_1$, $RCLK_2$, and $RCLK_3$. The waveforms for RDE 188, RDO 190, TDE 201, TDO 203, and TDATA 204 indicate only when these signals are valid or invalid and not their values. Periods when these signals are invalid are indicated by multiple "X"s. Typically, a signal is invalid while one of the signals from which it is generated is changing state.

FIG. 7A illustrates timing for slave device 104, which is near turnaround 137. $TCLK_1$ 162 is low by the time $RCLKD_1$ 161 falls, thus $SKIP_1$ 164 is low. Multiplexer 156 responds to $SKIP_1$ 164 by coupling $RDO_1$ 190 to latch 200. After converting the data from the receive clock domain to the transmit clock domain, latch 202 outputs $TDO_1$. Because there is virtually no signal propagation delay between slave device 104 and master device 102, the waveforms for $TDO_1$ 203 and $TDATA_1$ 204 are the same. As can be seen, $TDATA_1$ 204 is always substantially centered on the $RCLK_0$ 162 transition. This is indicated for one instance by vertical line 212, which is aligned with a transition of $RCLK_0$ 162 and intersects $TDATA_1$ 204.

Before discussing the timing near the middle of data bus 120, consider the easier case of timing far from turnaround 137. This case is illustrated in FIG. 7C. At this end of data bus 120, $TCLK_3$ 162 is still high when $RCLKD_3$ 161 falls, therefore $SKIP_3$ 164 is high. Multiplexer 156 responds to $SKIP_3$ 164 by coupling $RDE_3$ 188 to latch 200. After converting the data from the receive clock domain to the transmit clock domain, latch 202 outputs $TDO_3$ 203. $TDATA_3$ 204 is always substantially centered on the $RCLK_0$ 162 transition. This is indicated for one instance by vertical line 212, which is aligned with a transition of $RCLK_0$ 162 and intersects $TDATA_3$ 204.

FIG. 7B illustrates the timing for slave device 106, which is near the middle of data bus 120. When RCLKD$_2$ 161 falls, TCLK$_2$ 162 may be high or low, thus SKIP$_2$ 164 may be high or low. This is shown in FIG. 7B by two lines for SKIP$_2$ 164, one high and one low. As a result, multiplexer 156 may output to latch 200 either RDE$_2$ 188 or RDO$_2$ 190. The output of latch 200, TDE$_2$ 201, is enabled to follow its input while TCLK+90°$_2$ 166 is high. TDE$_2$ 201 is uncertain for a short period after the rising edge of TCLK+90°$_2$ 166. TDE$_2$ 201 may remain uncertain for a bit longer because one of its possible inputs, RDO$_2$ 190, is uncertain for a bit after latch 200 opens. TDE$_2$ 201, however, settles before TCLK+90°B$_2$ 167 goes high, regardless of which signal is selected by SKIP$_2$ 164. As a result, the output of latch 202, TDO$_2$ 203, is uncertain only for a short period after the rising edge of TCLK+90°B$_2$ 167. TDO$_2$ 203 is eventually coupled to data bus 120 and reaches master device 102 as TDATA$_2$ 204 after some propagation delay. TDATA$_2$ 204 is always substantially centered on the RCLK$_0$ 162 transition. This is indicated for one instance by vertical line 212, which is aligned with a transition of RCLK$_0$ 162 and intersects TDATA$_2$ 204.

FIGS. 7A, 7B, and 7C together thus illustrate that bus system 100 reduces clock-data skew by having clock and data signals travel together and arrive together at master device 102, regardless of slave position on data bus 120.

Bus system 100 also accommodates fixed latency protocols because data always reaches master device 102 at the same time regardless of the slave device transmitting the data. In some prior bus systems the variable signal propagation delay from slave to master would prevent the use of a fixed latency protocol.

The reason why variable signal propagation delay poses a challenge to a fixed latency protocols can be better understood with respect to the following Equation 2:

(2) Latency=2×(master-to-slave signal propagation delay)+Slave access delay

Of the two terms in Equation 2, within bus system 100, only signal propagation delay is variable. The access delay is the same for all slave devices, assuming all devices are the same. In contrast, signal propagation delay in bus system 100 can vary depending upon the location of the device relative to the turnaround. Consequentially, latency could vary by twice the master-to-slave propagation delay if synchronization circuitry 150 were absent.

FIGS. 7A, 7B, and 7C illustrate that synchronization circuitry 150 helps to ensure that the first byte of data arrives at master device 102 on the same rising edge of RCLK$_0$ 162. The first byte of data to arrive at master device 102 is denominated "A" of TDATA 204. The clock pulse of RCLK$_0$ 162 on which byte A should be valid is denominated "X". As can be seen in FIG. 7, vertical line 212 is aligned with the rising edge of pulse X and intersects valid byte A data of TDATA$_1$, TDATA$_2$, and TDATA$_3$.

FIG. 8 illustrates in block diagram form an alternative synchronization system 200. System 200 provides an alternative means for sending a data signal to data bus 120 such that the data signal will travel on data bus 120 in a constant phase relationship with respect to the clock signal. This is the same result achieved by previously discussed synchronization circuitry 150. System 200 is suited for designs in which the number of bits per data word that must be synchronized is large. A single instance of synchronization circuitry 150 is used to to realign multiple bits by coupling TLOAD 202 to synchronization circuitry 150, rather than RDATA 187. Synchronization circuitry 150 generates control signal 206, which is needed to translate data from the receive clock domain to the transmit clock domain. Control signal 206 is held active for one clock cycle, which occurs 2 clock cycles after TLOAD 202 goes active. Control signal 206 is held inactive after that one cycle until the next data word is to be synchronized.

Operation of synchronization is controlled, in part, by TLOAD 202 and RLOAD 204, which are both receive clock domain signals. TLOAD 202 is active on its positive going edge, which occurs two clock cycles before RLOAD 204 becomes active. This allows system 200 to account for the propagation delay through synchronization circuitry 150. RLOAD 204 is brought and held active high for one clock cycle to pass the data word to be synchronized. RLOAD 204 is held inactive until the next data word is received.

Thus, a bus system has been described that minimizes clock-data skew. The bus system includes a data bus, a clockline and synchronization circuitry. The clockline has two clockline segments. Each clockline segment extends the entire length of the data bus and is joined by a turnaround at one end of the data bus to the other clockline segment. The clockline ensures that clock and data signals travel in the same direction. Synchronization circuitry helps to ensure that data signals are placed onto the data bus such that data signals contemporaneously travel together with the clock signal used by a receiving device to receive the data.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A synchronous bus system for minimizing clock-data skew, the bus system comprising:
  a) an independent, single clock source generating a clock signal,
  b) a data bus having a first end and a second end;
  c) a clockline carrying the clock signal, the clockline having:
    i) a first clockline segment extending from the first end of the data bus to a turnaround near the second end of the data bus; and
    ii) a second clockline segment extending from the turnaround to the first end of the data bus; and
  d) synchronization circuitry having a transmit clock input coupled to a one of the first clockline segment and the second clockline segment wherein the synchronization circuitry synchronizes a data signal with the transmit clock input and sends the data signal to the data bus, the synchronization circuitry further including:
    i) a phase comparator for comparing a receive clock input to the transmit clock input to generate a select signal;
    ii) a first delay element having a first data input, a first data output, and a first enable input, the first data input being coupled to the data signal and the first enable input being coupled to the receive clock input;

iii) a second delay element having a second data input, a second data output, and a second enable input, the second data input being coupled to the first data output and the second enable input being coupled to a complement of the receive clock input;

iv) a multiplexer having a mux output, a first mux input coupled to the first data output and a second mux input coupled to the second data output, the multiplexer selecting between the first mux input and the second mux input in response to the select signal;

v) a first latch having a fourth data input, a fourth data output and a fourth enable input, the fourth data input being coupled to the mux output, the fourth enable input being coupled to an advanced phase version of the transmit clock input; and vi) a second latch having a fifth data input, a fifth data output and a fifth enable input, the fifth data input being coupled to the fourth output, the fifth enable input being coupled to a complement of the advanced phase version of the transmit clock input, and the fifth data output outputting a second data signal.

2. The synchronous bus system of claim 1, wherein the first delay element comprises a latch and the second delay element comprises a latch.

3. The synchronous bus system of claim 1, further comprising a clock coupled to an end of a one of the first segment and the second clockline segment.

4. The synchronous bus system of claim 1, further comprising a multiplicity of devices coupled to the data bus, each of the devices including synchronization circuitry.

5. A synchronous bus system for minimizing clock-data skew, the bus system comprising:

a) a data bus having a first end and a second end;
b) a clockline carrying a clock signal, the clockline having:
   i) a first clockline segment extending from the first end of the data bus to a turnaround near the second end of the data bus;
   ii) a second clockline segment extending from the turnaround to the first end of the data bus; and
c) a first device coupled to the data bus for transmitting data to a second device, including synchronization circuitry, the synchronization circuitry synchronizing a data signal and the clock signal on a transmit clockline segment, the second device having the transmit clockline segment, the transmit clockline segment being a selected one of the first and second clockline segments, the synchronization circuitry including:
   i) a phase comparator for comparing a receive clock input to a transmit clock input to generate a select signal, the transmit clock input being the transmit clockline segment;
   ii) a delay element coupled to the data signal and outputting a delayed data signal;
   iii) a multiplexer for selecting between the data signal and the delayed data signal in response to the select signal, the multiplexer having a mux output; and
   iv) a latch having an input coupled to the mux output, the latch having an enable input coupled to the transmit clock input, and an output outputting a second data signal aligned with the transmit clock input.

6. The synchronous bus system of claim 5 wherein the delay element comprises a latch.

7. The synchronous bus system of claim 5 wherein the phase comparator comprises a latch.

8. The synchronous bus system of claim 5 further comprising a clock coupled to an end of a one of the first and second clockline segments.

9. A synchronous bus system for minimizing clock-data skew, the bus system comprising:

a) a data bus having a first end and a second end;
b) a clockline carrying a clock signal, the clockline having:
   i) a first clockline segment extending from the first end of the data bus to a turnaround near the second end of the data bus;
   ii) a second clockline segment extending from the turnaround to the first end of the data bus; and
c) synchronization circuitry for synchronizing a multiplicity of data signals with the clock signal on a transmit clockline segment and for sending the multiplicity of data signals to the data bus, the transmit clockline segment being a selected one of the first and second clockline segments, the synchronization circuitry including:
   i) a phase comparator for comparing a receive clock input to a transmit clock input to generate a select signal, the transmit clock input being the transmit clockline segment;
   ii) a delay element coupled to a first control signal and outputting a delayed first control signal;
   iii) a multiplexer for selecting between the first control signal and the delayed first control in response to the select signal, the multiplexer having a mux output;
   iv) a first latch having an input coupled to the mux output, the latch having an enable input coupled to the transmit clock input, and an output outputting a second control signal aligned with the transmit clock input;
   v) a second latch having a multiplicity of inputs coupled to the multiplicity of data signal and having an enable input coupled to a third control signal, and having a multiplicity of second latch outputs;
   vi) a third latch having a multiplicity of inputs coupled to the multiplicity of second latch outputs, and having an enable input coupled to the second control signal and a multiplicity of third latch outputs coupled to data bus.

10. The synchronous bus system of claim 9 wherein the delay element comprises a latch.

11. The synchronous bus system of claim 9 wherein the phase comparator comprises a latch.

12. The synchronous bus system of claim 9 further comprising a clock coupled to an end of a one of the first and second clockline segments.

13. A synchronous system operable without framing signals for minimizing clock-data skew comprising:

a) a single independent clock source generating a clock;
b) a single clockline carrying the clock signal, the clockline including:
   i) a first clockline segment having a first end, and a second end, the first end being coupled to the clock source;

ii) a turnaround coupled to the second end of the first clockline segment;

iii) a second clockline segment having a first end and a second end, the first end being coupled to the turnaround;

c) a data bus having a first end and a second end, the data bus extending from the first end of the first clockline segment to the second end of the first clockline segment, the data bus carrying a first data signal, the first data signal propagating on the data bus contemporaneously and in a constant phase relationship with the clock signal traveling on the first clockline segment;

d) a first device comprising a first circuit for transmitting the first data signal to the data bus upon arrival at the first device of the clock signal on the first clockline segment; and e) a second device copying a second circuit for receiving the first data signal on the data bus upon arrival at the second device of the clock signal on the first clockline segment, said second circuit transmitting second data signal to the data bus upon arrival of the clock signal on the second clockline segment, the second data signal traveling on the data bus contemporaneously and in a constant phase relationship with the clock signal traveling on the second clockline segment.

14. The synchronous bus system of claim 13, wherein said first device further comprises a receive circuit for receiving the second data signal upon arrival of the clock signal on the second clockline segment.

15. The synchronous bus system as set forth in claim 13, further comprising a third device comprising a third circuit for receiving the second data signal upon arrival at the third device of the clock signal on the second clockline segment.

16. A method for minimizing clock-data skew in a synchronous bus system operable without framing signals, the synchronous bus system having devices coupled to a data bus and a clockline, the data bus having a first end and a second end, the clockline having a first clockline segment extending from the first end of the data bus to a turnaround near the second end of the data bus and a second clockline segment extending from the turnaround to the first end of the data bus, and a single independent clock coupling a clock signal to the first end of the first clockline segment, the method comprising the steps of:

a) transmitting a first data signal to the data bus by a first device upon arrival of the clock signal on the first clockline segment at the first device, the first data signal traveling on the data bus in a same direction as the clock signal on the first clockline segment, the first data signal traveling on the data bus contemporaneously and in a constant phase relationship with the clock signal traveling on the first clockline segment;

b) receiving at a second device the first data signal from the data bus upon arrival at the second device of the clock signal on the first clockline segment, the second device being coupled to the first clockline segment; and c) transmitting a second data signal from the second device to the data bus upon arrival of the clock signal on the second clockline segment at the second device, the second data signal traveling on the data bus in a same direction as the clock signal on the second clockline segment, the second data signal traveling on the data bus contemporaneously and in a constant phase relationship with the clock signal traveling on the second clockline segment.

17. The method according to claim 16 wherein the second data signal is transmitted such that the second data signal arrives at a third device simultaneously with the clock signal on the second clockline segment.

18. The method of claim 16 further comprising the step of said third device receiving the second data signal upon arrival of the clock signal on the second clockline segment.

19. A method for minimizing skew in a synchronous bus system, said system comprising a clock line and a data bus, said clockline having a first clockline segment and a second clockline segment, said first clockline segment having a first end coupled to a clock source and a second end coupled to a turnaround, said second clockline segment having a first end and a second end, said first end coupled to the turnaround, said data base having a first end and a second end, said data bus extending from the first end of the first clockline segment to the second end of the first clockline segment, said method comprising the steps of:

coupling a first device to the data bus and the first and second clockline segments;

coupling a second device to the data bus and the first and second clockline segments, said second device coupled near the turnaround;

if a first data signal is to be transmitted from the first device to the second device;

transmitting the first data signal to the data bus by the first device upon arrival of a clock signal on the first clockline segment at the first device, the first data signal traveling on the data bus in a same direction as the clock signal on the first clockline segment, and receiving the first data signal at the second device from the data bus upon arrival of the clock signal on the first clockline segment; and if a second data signal is to be transmitted from the second device to the first device;

transmitting the second data signal to the data bus by the second device upon arrival of a clock signal on the second clockline segment at the second device, the second data signal traveling on the data bus in a same direction as the clock signal on the second clockline segment, and receiving the second data signal at the first device from the data bus upon arrival of the clock signal on the second clockline segment.

20. A synchronous system operable without framing signals for minimizing clock-data skew comprising:

a) a single independent clock source generating a clock;

b) a single clockline carrying the clock signal, the clockline including:

i) a first clockline segment having a first end and a second end, the first end being coupled to the clock source;

ii) a turnaround coupled to the second end of the first clockline segment;

iii) a second clockline segment having a first end and a second end, the first end being coupled to the turnaround;

c) a data bus having a first end and a second end, the data bus extending from the first end of the first clockline segment to the second end of the first clockline segment, the data bus carrying a first data signal, the first data signal propagating on the data bus contemporaneously and in a constant phase relationship with the clock signal traveling on the second clockline segment;

d) a first device comprising a first circuit for transmitting the first data signal to the data bus upon arrival at the first device of the clock signal on the second clockline segment; and e) a second device comprising a second circuit for receiving the first data signal on the data bus upon arrival at the second device of the clock signal on the second clockline segment, said second circuit transmitting a second data signal to the data bus upon arrival of the clock signal on the first clockline segment, the second data signal traveling on the data bus contemporaneously and in a constant phase relationship with the clock signal traveling on the first clockline segment.

21. The synchronous system as set forth in claim 20, wherein the first device is a master device and the second device is a slave device.

22. A method for minimizing clock-data skew in a synchronous bus system operable without framing signals, the synchronous bus system having devices coupled to a data bus and a clockline, the data bus having a first end and a second end, the clockline having a first clockline segment extending from the first end of the data bus to a turnaround near the second end of the data bus and a second clockline segment extending from the turnaround to the first end of the data bus, and a single independent clock coupling a clock signal to the first end of the first clockline segment, the method comprising the steps of:

a) transmitting a first data signal to the data bus by a first device upon arrival of the clock signal on the second clockline segment at the first device, the first data signal traveling on the data bus in a same direction as the clock signal on the second clockline segment, the first data signal traveling on the data bus contemporaneously and in a constant phase relationship with the clock signal traveling on the second clockline segment;

b) receiving at a second device the first data signal from the data bus upon arrival at the second device of the clock signal on the second clockline segment, the second device being coupled to the second clockline segment; and c) transmitting a second data signal from the second device to the data bus upon arrival of the clock signal on the first clockline segment at the second device, the second data signal traveling on the data bus in a same direction as the clock signal on the first clockline segment, the second data signal traveling on the data bus contemporaneously and in a constant phase relationship with the clock signal traveling on the first clockline segment.

* * * * *